June 4, 1968 J. J. DRISCOLL 3,387,111
CARBON-ARC CUTTING APPARATUS
Filed April 22, 1965
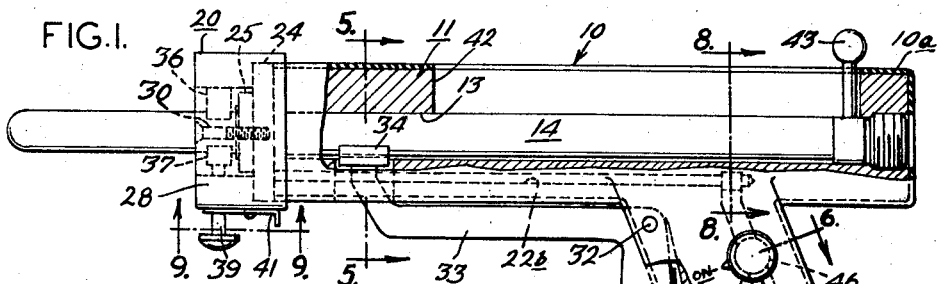
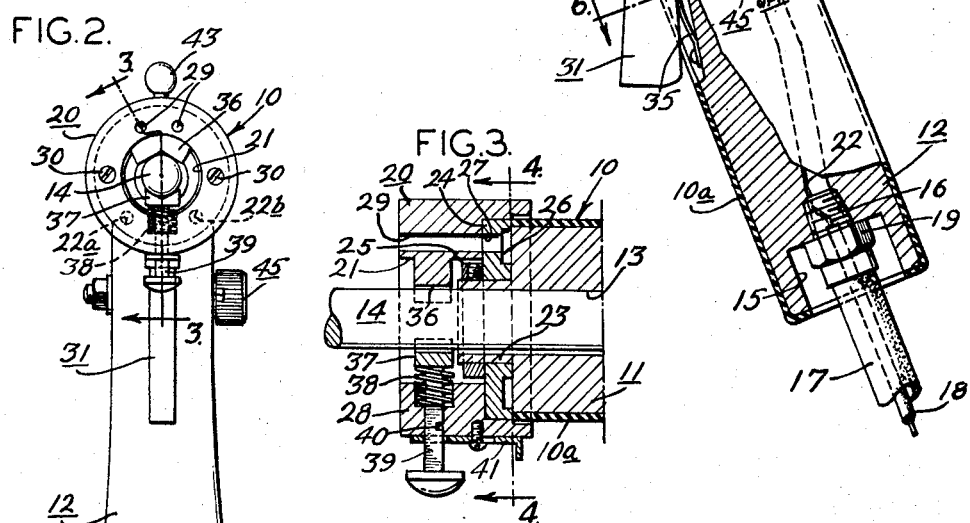
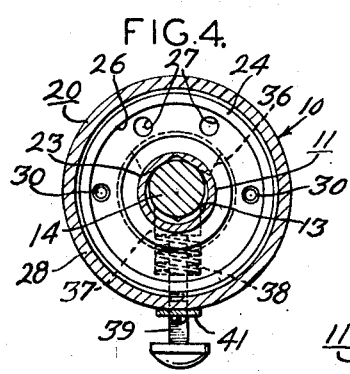
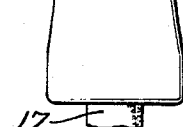
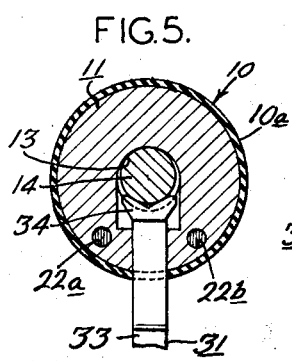
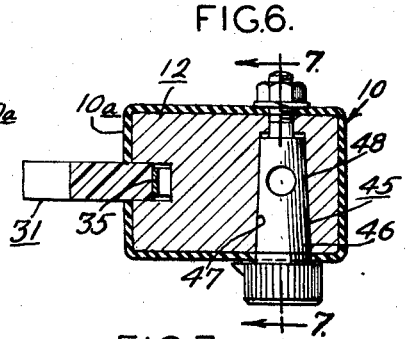
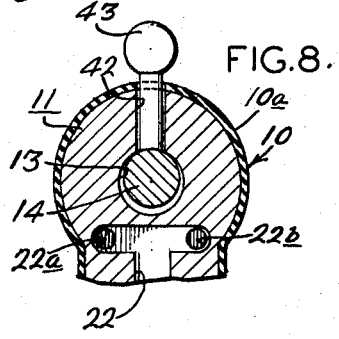
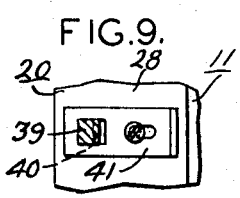
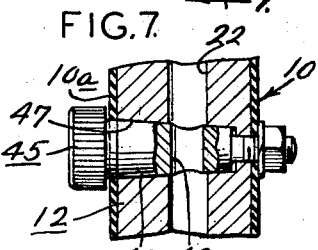
INVENTOR:
JOHN J. DRISCOLL
BY
Howson & Howson
ATTYS.

United States Patent Office 3,387,111
Patented June 4, 1968

3,387,111
CARBON-ARC CUTTING APPARATUS
John J. Driscoll, 422 S. 18th St.,
Allentown, Pa. 18104
Filed Apr. 22, 1965, Ser. No. 449,998
7 Claims. (Cl. 219—70)

ABSTRACT OF THE DISCLOSURE

A cutting tool comprising a barrel adapted to mount a consumable electrode and to blow a gaseous medium such as air along one side of the electrode projecting from the tool to blow away the melt produced by the electrode. The tool includes a barrel having a bore mounting the electrode for axial movement therein with an electrode feeder at one end of the bore and a rotatable head surrounding the projecting electrode at the other end of the bore in which gaseous medium outlets are provided. A first clamping means is provided to clamp the electrode against the barrel and a second clamping means is provided to clamp the electrode against the head so as to center it between the outlets. The rotary head is of an improved construction affording the formation thereof by simple machining or molding operations.

---

The present invention relates to a tool for cutting metal with an electrode, and more specifically to a hand tool for performing the air carbon-arc cutting process.

Air carbon-arc cutting is primarily a progressive melting of a metal with an electrode, which melt is blown away by high velocity jets of gaseous medium, usually air. Conventionally, the process utilizes an electrode, the electrode being composed of a special mixture of carbon and graphite and usually copper coated to increase life, provide a uniform groove, increase the current-carrying capacity of the rod or electrode while reducing radiated heat.

Conventionally carbon-arc cutting is accomplished by using an electrode in an ordinary welding gun, the welding gun being held in one hand while a jet of air is directed, from a separate hose held in the other hand, towards the work piece being cut. However, as may be imagined, cutting in this manner is difficult. Thus the Stepath device, as disclosed in the Stepath Patent 2,706,236 provided the first commercially successful hand-held cutting tool for practicing the air carbon-arc cutting process.

The Stepath device, however, has many inherent disadvantages. For example, the end of the electrode not being used is exposed, and as the electrode is fragile, is easily broken by inadvertent contact with adjacent structure. In addition, as the non-working end of the electrode is exposed, when working in close quarters it is difficult to prevent the exposed electrode from contacting adjacent metallic structure thus causing sticking of the rod to the metal and/or gouging of the metal thus touched. Another disadvantage of the Stepath tool is that it must always be held at an angle when cutting. This makes it difficult to use the Stepath device when working on structures in an overhead position. Further, the position of the air holes in the Stepath apparatus with respect to the electrode, limits the preferable cutting of the metal to moving the tool in one direction, unless the entire tool is reoriented in the user's hand.

In view of the above, it is a principal object of the present invention to overcome the disadvantages of the Stepath device and provide a novel hand tool for use in practicing the air carbon-arc cutting process.

Another object of the present invention is to provide a holder for the electrode which will permit exposure of only the portion of the electrode being used thus preventing inadvertent cutting or gouging by the opposite or non-working end of the electrode.

Another object of the present invention is to provide a novel hand tool for practicing the air carbon arc cutting process which prevents excess economic loss due to inadvertent breakage of the electrode.

Another object of the present invention is to provide air jet means on the novel cutting tool for permitting cutting a work piece in any direcion.

Still another object of the present invention is to provide means on the novel tool for permitting the adjustment of the direcion of the air in order that cutting and blowing away of the melt may be accomplished at any angle and in any direction.

Still another object of the present invention is to provide an easily held, hand operated tool for utilization in practicing the air carbon-arc cutting process.

Other objects and a fuller understanding of the invention may be had by referring to the following description and claims taken in conjunction with the accompanying drawing in which:

FIG. 1 is a side profile view with portions broken away of a novel device constructed in accordance with the present invention;

FIG. 2 is an end view of the device shown in FIG. 1;

FIG. 3 is a fragmentary enlarged sectional view taken along line 3—3 of FIG. 2;

FIG. 4 is a sectional view taken along line 4—4 of FIG. 3;

FIG. 5 is a sectional view taken along line 5—5 of FIG. 1;

FIG. 6 is a sectional view taken along line 6—6 of FIG. 1;

FIG. 7 is a fragmentary sectional view taken along line 7—7 of FIG. 6;

FIG. 8 is a fragmentary sectional view taken along line 8—8 of FIG. 1; and

FIG. 9 is a fragmentary sectional view taken along line 9—9 of FIG. 1.

Referring now to the drawing, and specifically FIG. 1 thereof, a tool 10 having a barrel 11 and a pistol-grip type handle 12, angularly offset from the barrel 11, is illustrated therein. As illustrated, the barrel 11 has an axially extending bore 13 to receive therein an electrode 14, preferably of the copper-coated carbon and graphite composition type. A tubular head 20 having a bore 21 is rotatably and coaxially connected to one end of the barrel. A recessed portion 15 in the handle 12 has a connector 16 for receipt of a connector 19 of an air hose 17. The air hose 17 has a power supply lead 18 connected to the connector 19. In order to provide electrical continuity between the power supply lead and the electrode 14, the tool 10 is preferably composed of a conductive material, such as copper-bronze and covered with an insulator 10a to prevent inadvertent shocks to the user.

In accordance with the invention, means are provided in the head 20 to permit a high velocity jet of air to flow therefrom to strike a work piece adjacent the point of contact of the cutting electrode 14, no matter which circumferential position the head is in relative to the axis of the bore 13. To this end, a passageway 22 extends from the connector 16, into the barrel 11 and there branches into two passageways 22a and 22b, which passageways terminate at the end of the barrel 11 adjacent the rotating head 20. As illustrated in FIG. 3, the barrel 11 has an axially projecting tubular portion 23 having an annulus 24 circumscribing the tubular portion 23 and rotatable with respect thereto. The annulus 24 is limited against axial movement by a collar 25 connected to the tubular portion 23. The annulus 24 has a rearwardly facing, and in the present instance axially concentric, annular recess 26 which permits fluid communication of apertures 27 with the air hose 17 via the passageways 22. A ring 28 having apertures 29 aligned with the apertures 27, is connected to the annulus 24 by, in the present instance, screws 30 to permit rotation of the annulus 24 therewith. As illustrated in FIGS. 1-3, the apertures 29 permit the flow of a gaseous medium, usually air, to emit from the head 20 substantially parallel to the axis of the barrel 11 but at any rate to impinge upon the work piece closely adjacent the point at which the electrode strikes the work piece.

In accordance with another feature of the invention, means are provided to clamp and securely hold the electrode 14 relative to the barrel 11, which means may easily be released to permit movement of the electrode 14 out of the barrel and head as the electrode is consumed. To this end, first clamping means comprising a trigger 31 having a pivot 32 and a longitudinal extending arm 33, has at its terminal end a yoke 34, which yoke passes into the barrel 11 for engagement with the electrode 14. As illustrated in FIGS. 1 and 5, the first clamping means is biased into the clamping position by a spring 35 positioned in the handle. Second clamping means, in the present instance preferably located in the head 20, serves to add rigidity to the electrode 14 and comprises, in the present instance, a fixed clamp 36 and a radially movable clamp 37 to engage the electrode 14.

As illustrated in FIG. 4, the movable clamp 37 is biased normally radially inward by a spring 38 and includes a stem 39 having a notch 40 (see FIG. 3) therein for permitting locking the stem 39 outwardly upon engagement of the notch 40 with a thumb slide 41. In this manner, pressure on the trigger 31 and locking of the stem 39 with the thumb slide 41 permits easy movement of the electrode 14 axially of the barrel 11.

In order to provide axial movement of the electrode in the bore 13, as the electrode is consumed, electrode feed means is provided. As illustrated in FIGS. 1 and 8, the barrel 11 contains a slot 42 receiving an outwardly projecting handle 43, the lower portion of which has a head slidable in the bore and engageable with one end of the electrode 14. Thus release of the clamping means and movement of the handle 43 in the slot 42 towards the head 20 permits feeding of the desired amount of electrode axially of the barrel.

In order that a gaseous medium, such as air, may be directed through the passageway when desired, the handle 12 of the tool 10 is provided with valve means 45, interposed in the passageway 22 to control the flow of gaseous medium therethrough. In the present instance, the valve means 45 comprises a tapered stem 46 fitted in a like hole 47 in the handle 12, the stem having an aperture 48 therein for registering with the passageway 22 when in the first or "on" position and rotatable so as to prevent the flow of air through the passageway 22 when the stem is rotated to a second or "off" position. Of course the valve may be of any well known form to permit the desired flow.

Thus the present invention provides a novel cutting tool for carrying out the air carbon-arc cutting process, which tool permits cutting of a work piece by moving the tool in any direction and rotating the head to direct air jets to blow away the melt in a direction away from the operator. Further, the tool provides protection for the non-working end of the electrode while preventing accidental contact of the non-working portion with adjacent structure when working in close quarters.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A tool for cutting metal with an electrode comprising in combination: a barrel having an axially extending bore therein for receiving and enclosing a portion of said electrode; a pistol grip handle angularly offset from said barrel and connected thereto; a connector in said tool for receipt of a hose for passing a gaseous medium therethrough; a connection for providing a potential on said electrode; at least one passageway from said hose connector to one end of said barrel; said barrel having an axially projecting tubular portion at said one end; a rotatable head comprising an annulus circumscribing the tubular portion and rotatable with respect thereto; means to limit axial movement of said annulus on said tubular portion; said annulus having a rearwardly facing annular recess and an axial aperture therein permitting fluid communication of said aperture with said passageway regardless of the circumferential orientation of said annulus; a ring-like member, connected to said annulus and having at least one axially extending aperture aligned with the aperture in said annulus; said ring having an internal diameter sufficient to permit passage therethrough of an electrode, and said aperture in said ring being positioned to provide a flow of gaseous medium therefrom substantially parallel to the axis of said bore regardless of the circumferential position of said ring.

2. A tool for cutting metal with an electrode in accordance with claim 1 including an axially extending slot in said barrel; a handle projecting outwardly therefrom and connected interiorly of said barrel in said bore to a head engageable with one end of said electrode whereby said electrode may be moved axially of said bore.

3. A tool for cutting metal with an electrode in accordance with claim 1 including first clamping means in said barrel, said clamping means comprising: a pivoted trigger on said handle and a longitudinally and axially extending arm connected thereto, said arm having a yoke projecting into said barrel in said bore for engagement with an electrode.

4. A tool for cutting metal with an electrode in accordance with claim 3 including second clamping means in said head for clamping said electrode adjacent the point of projection of said electrode from said head.

5. A tool for cutting metal with a consumable electrode comprising in combination: a barrel having an axially-extending bore therein enclosing an inner end portion of said electrode for axial movement, said bore being open at one end for axially projecting the outer end portion of said electrode therefrom; a handle connected to said barrel; a gaseous medium connection and means for providing a potential on said barrel; a tubular head rotatably and coaxially mounted on said barrel at said one end surrounding the projecting portion of said electrode; at least one aperture in said head having an outlet positioned to provide flow of gaseous medium axially therefrom along said projecting portion of said electrode; means connecting said gaseous medium connection to said aperture throughout rotation of said tubular head on said barrel; first clamping means in said barrel for clamping the electrode against said barrel; and second clamping means in said head for clamping said electrode against said head adjacent the point of projection of said electrode from said head.

6. A tool according to claim 5 including electrode feed means comprising a head slidably mounted in said barrel at the other end and engaging the enclosed end portion of said electrode for moving said electrode out of the barrel through said rotatable head as said electrode is consumed.

7. A tool according to claim 5 including a second outlet in said rotatable head closely adjacent said one outlet, said clamping means operable to positively position said electrode along the perpendicular center line between said outlets.

References Cited

UNITED STATES PATENTS

| | | | |
|---|---|---|---|
| 2,852,658 | 9/1958 | Keiter | 219—70 |
| 3,035,155 | 5/1962 | Hawk | 219—70 X |
| 3,042,791 | 7/1962 | Reeh | 219—75 |
| 3,113,201 | 12/1963 | Stepath | 219—70 |

RICHARD M. WOOD, *Primary Examiner.*

R. F. STAUBLY, *Assistant Examiner.*